(12) United States Patent
Mazo et al.

(10) Patent No.: US 10,927,047 B2
(45) Date of Patent: Feb. 23, 2021

(54) POLYMERIC COMPOSITIONS WHICH MINIMIZE PHOSPHATE FIXATION

(71) Applicant: Verdesian Life Sciences U.S., LLC, Cary, NC (US)

(72) Inventors: Jacob Mazo, Wilmette, IL (US); Grigory Mazo, Wilmette, IL (US)

(73) Assignee: Verdesian Life Sciences U.S., LLC, Cary, NC (US)

( * ) Notice: Subject to any disclaimer, the term of this patent is extended or adjusted under 35 U.S.C. 154(b) by 215 days.

(21) Appl. No.: 15/999,255

(22) PCT Filed: Feb. 17, 2017

(86) PCT No.: PCT/US2017/018489
§ 371 (c)(1),
(2) Date: Aug. 17, 2018

(87) PCT Pub. No.: WO2017/143271
PCT Pub. Date: Aug. 24, 2017

(65) Prior Publication Data
US 2019/0119181 A1 Apr. 25, 2019

Related U.S. Application Data

(60) Provisional application No. 62/296,752, filed on Feb. 18, 2016.

(51) Int. Cl.
*C05B 17/00* (2006.01)
*C05G 5/30* (2020.01)
(Continued)

(52) U.S. Cl.
CPC ............ *C05G 5/37* (2020.02); *C05B 7/00* (2013.01); *C05B 17/00* (2013.01); *C05G 3/00* (2013.01);
(Continued)

(58) Field of Classification Search
CPC ... C05G 5/37; C05G 3/00; C05G 5/20; C05G 5/12; C08L 35/02; C08L 33/14;
(Continued)

(56) References Cited

U.S. PATENT DOCUMENTS

| 4,867,972 A | 9/1989 | Girardeau et al. |
| 5,009,805 A | 4/1991 | Perner et al. |

(Continued)

FOREIGN PATENT DOCUMENTS

| CN | 105246997 A | 1/2016 |
| JP | 0859382 A | 3/1996 |

(Continued)

OTHER PUBLICATIONS

International Search Report and Written Opinion of the International Searching Authority for application PCT/US2017/018489 dated Jun. 7, 2017, 14 pages.

(Continued)

*Primary Examiner* — Jennifer A Smith
(74) *Attorney, Agent, or Firm* — Katten Muchin Rosenman LLP

(57) ABSTRACT

Polymeric compositions useful for use with solid or liquid phosphate fertilizers include one or more first copolymers having at least two repeat units selected from maleic, itaconic, and sulfonate repeat units, and one or more second copolymers having maleic and olefinic repeat units. The compositions are capable of synergistically reducing or eliminating phosphate fixation, and are relatively low in cost. The compositions may also be supplemented with product-marking dyes and second copolymers having high and low molecular weight profiles in order to control fines or dust during handling and application of solid phosphate fertilizers.

23 Claims, 1 Drawing Sheet

(51) Int. Cl.
- *C08L 33/14* (2006.01)
- *C05B 7/00* (2006.01)
- *C08L 35/02* (2006.01)
- *C08F 220/38* (2006.01)
- *C05G 3/00* (2020.01)
- *C08F 222/06* (2006.01)

(52) U.S. Cl.
CPC .......... *C08F 220/38* (2013.01); *C08F 222/06* (2013.01); *C08L 33/14* (2013.01); *C08L 35/02* (2013.01); *C08L 2203/00* (2013.01)

(58) Field of Classification Search
CPC ... C08L 2203/00; C08L 23/22; C08K 5/0041; C08K 5/3725; C08F 220/38; C08F 222/06; C08F 10/10; C08F 220/06
See application file for complete search history.

(56) References Cited

U.S. PATENT DOCUMENTS

| | | |
|---|---|---|
| 6,566,477 B2 | 5/2003 | Sanders et al. |
| 8,524,649 B2 | 9/2013 | Leyrer |
| 8,974,806 B2 | 3/2015 | Amrhein et al. |
| 10,005,891 B2 | 6/2018 | Jeong et al. |
| 2010/0298526 A1 | 11/2010 | Tsumori et al. |
| 2014/0106024 A1 | 4/2014 | Sanders |
| 2014/0143909 A1 | 5/2014 | Greenshields et al. |
| 2016/0096938 A1* | 4/2016 | Jeong ................... C09J 7/25 428/215 |

FOREIGN PATENT DOCUMENTS

| | | |
|---|---|---|
| JP | 2007044010 A | 2/2007 |
| WO | 2015031521 A1 | 3/2015 |

OTHER PUBLICATIONS

Chen et al.; Review of maleic-itaconic acid copolymer purported as urease inhibitor and phosphorus enhancer in soils, Agronomy Journal, 2017, vol. 106, No. 2, pp. 423-430.

Notification of Reason for Refusal for JP Patent Application No. 2018-543690, dated Sep. 15, 2020.

Substantive Examination Adverse Report for MY Application No. PI 2018001466, dated Nov. 13, 2020.

Keizaburo Kawaguchi Characteristics of Soil Improvement Agent (2) Synthetic Polymer, Physicality of Soil, Japan, the Society of Soil Physics, Jan. 31, 1963, No. 7, pp. 29-41.

\* cited by examiner

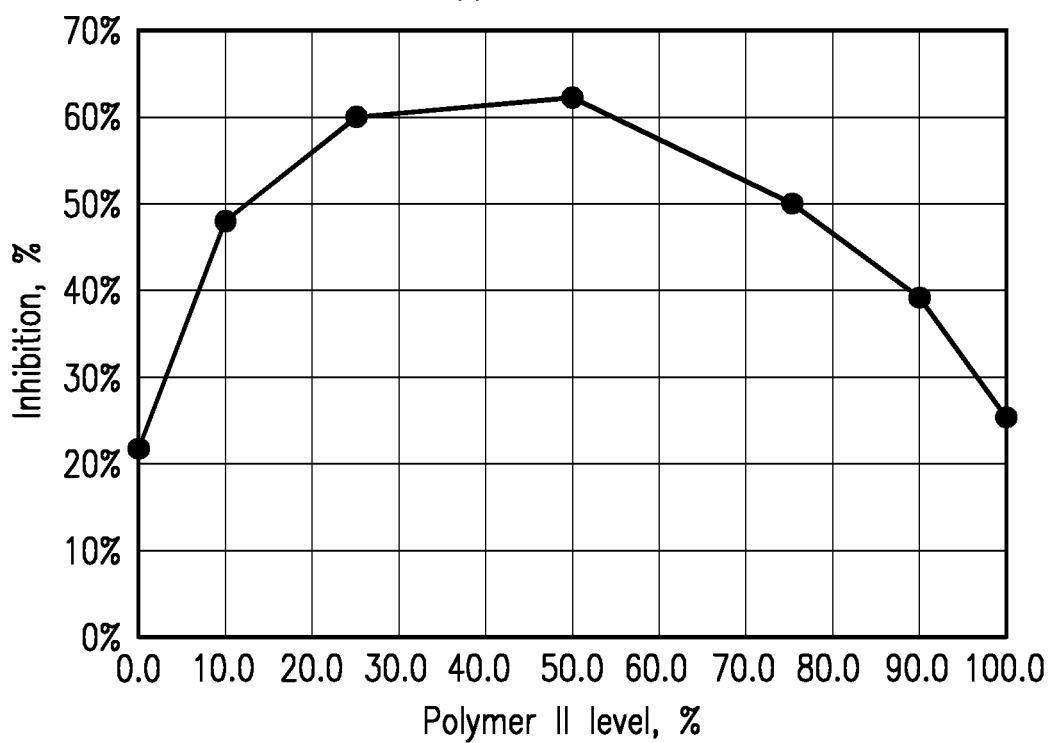

POLYMERIC COMPOSITIONS WHICH MINIMIZE PHOSPHATE FIXATION

CROSS-REFERENCE TO RELATED APPLICATION(S)

This application is a U.S. National Stage entry of International Application No. PCT/US2017/018489 filed Feb. 17, 2017, which claims the benefit of U.S. Provisional Patent Application, Ser. 62/296,752, filed Feb. 18, 2016, each of which is herein incorporated by reference in its entirety for all purposes.

BACKGROUND OF THE INVENTION

Field of the Invention

The present invention is broadly concerned with improved polymeric compositions designed for use with phosphate fertilizers in order to eliminate or minimize phosphate fixation. More particularly, the invention is concerned with such compositions, as well as fertilizer composites including the compositions and uses of the composites, wherein the compositions include a first copolymer having at least two of maleic, itaconic, and sulfonate repeat units, and a second copolymer having maleic and olefinic repeat units. The composites are capable of synergistically controlling phosphate fixation levels equivalent existing to commercial products, but at substantially reduced costs.

Description of the Prior Art

Phosphate fertilizers are widely used in agriculture in order to provide phosphate nutrition to plants. Such fertilizers may be in solid or granular form (e.g., MAP or DAP), or in liquid form (e.g., ammonium polyphosphates). However, the beneficial effects of phosphate fertilizers can be substantially lessened owing to the effects of phosphate fixation. This refers to the reaction of orthophosphates with Ca, Al, or Fe ions in the soil, which prevents uptake of the phosphates by plants.

A variety of products have been proposed in the past for use with phosphate fertilizers in order to ameliorate the effects of phosphate fixation. These include the highly successful, commercially available AVAIL® products which are partial copolymer salts substantially composed of maleic and itaconic repeat units. These products have a high amount of anionic charge per unit of weight, and essentially completely control phosphate fixation when used at recommended levels. However, such prior art products tend to be relatively expensive and therefore equally effective, lower cost substitutes would be highly advantageous.

In many cases, solid fertilizer sellers and growers would like to be able to readily mark or determine whether solid fertilizers have in fact been coated or treated with the polymeric products, such as AVAIL®. Presently, growers must rely upon the honesty of the sellers insofar as polymeric treatment of the solid fertilizers is concerned, because there is no easy way to visually confirm that the solid fertilizers have been treated. Therefore, it would be desirable to provide coating compositions for solid fertilizers which are effectively dyed to allow ready visual inspection of the products.

Solid fertilizers are also prone to the creation of fines or dust owing to handling and application of the solids. Again, various anti-dust products have been proposed in the past, but generally these are separate products apart from anti-fixation polymers. This necessitates additional treatment and handling of the solids with consequent additional costs.

SUMMARY OF THE INVENTION

The present invention overcomes the problems outlined above and provides greatly improved polymeric anti-fixation compositions for use with phosphate fertilizers. Broadly speaking, the compositions comprise a first copolymer having at least two of maleic, itaconic, and sulfonate repeat units, and a second copolymer having maleic and olefinic repeat units. The first copolymer thus may include maleic and itaconic, maleic and sulfonate, and/or itaconic and sulfonate repeat units, as well as other repeat units. Maleic and itaconic repeat units may be derived from the corresponding acids or anhydrides, whereas sulfonate repeat units are derived from monomers possessing at least one carbon-carbon double bond and at least one sulfonate group; all of these repeat units may individually be in acid or partial or complete salt form.

The first copolymer preferably has at least about 85% by weight maleic and/or itaconic repeat units therein, and preferably consists essentially of maleic and itaconic repeat units. The second copolymer has one or more olefinic repeat units and is likewise preferably composed of at least about 85% by weight maleic and olefinic repeat units, and more preferably consists essentially of maleic and olefinic repeat units. Surprisingly, it has been found that the first and second copolymers in combination may give a synergistic anti-fixation effects, in that the combinations have greater phosphate fixation inhibition properties as compared with the individual copolymers.

The copolymers have different molecular weight profiles, as described below. Unless otherwise indicated, the molecular weight ranges are determined as number-averaged molecular weights based upon polyethylene glycol/polyethylene oxide (PEG/PEO) standards, where the PEG standard is used for lower molecular weight copolymers and PEO is used for higher molecular weight standards. These molecular weight determinations are well within the skill of the art.

The compositions of the invention are normally, but not necessarily, in aqueous dispersion or solution form and have a copolymer solids content of from about 1-60% by weight, with the first and second copolymers present as partial salts. The compositions can thus be readily sprayed or otherwise applied to solid phosphate fertilizers, or mixed with liquid phosphate fertilizers. The weight ratio of the first copolymer to the second copolymer ranges from about 1:19 to about 19:1.

Where color marking of treated phosphate fertilizers is desired, the compositions of the invention may be supplemented with one or more dyes and solvent(s). The most preferred dye is Acid Violet 17 and the most preferred solvent is dipropylene glycol.

In order to provide dust control for solid phosphate fertilizers, the compositions of the invention may include respective amounts of Polymer II copolymers (described below) having different molecular weight profiles. Specifically, the compositions include one copolymer having a molecular weight of up to about 70,000 Da, and another copolymer having a higher molecular weight in excess of 200,000 Da. Additionally, the high molecular weight/low molecular weight Polymer II copolymer compositions may be used independently of any copolymer containing maleic, itaconic, and sulfonate repeat units.

BRIEF DESCRIPTION OF THE DRAWING

The single FIGURE is a graph illustrating the phosphate fixation inhibition properties of combined copolymer compositions of the invention comprising Polymer I and Polymer II amounts, versus the properties of Polymer I and Polymer II alone, as described in Example 7.

DETAILED DESCRIPTION OF THE PREFERRED EMBODIMENT

As noted previously, the compositions of the invention enhance the utility and efficiency of phosphate fertilizers by minimizing or eliminating phosphate fixation. Generally speaking, these compositions comprise at least two copolymers respectively taken from separate, general classes of copolymers. As used herein, "copolymer" refers to a polymer having at least two different monomers or repeat units, and thus encompasses terpolymers, tetrapolymers, and higher order polymers. These different types of copolymers are discussed separately below as "Polymer I" and "Polymer II."

Polymer I

Broadly speaking, the Polymer I compositions of the invention are in the form of copolymers containing at least two of maleic, itaconic, and sulfonate moieties or repeat units, although such copolymers may also contain other repeat units, such as different dicarboxylates and/or sulfonates. Specific examples of Polymer I copolymers are set forth below as Class I, Class II, and Class IIA copolymers. These copolymers are usually employed in partial salt form in aqueous dispersion or solution, at pH levels of from about 0.5-8, more preferably from about 3.5-6.5.

Class I Copolymers Containing Maleic and Itaconic Repeat Units

Broadly speaking, the polyanionic copolymers of this class are of the type disclosed in U.S. Pat. No. 8,043,995, which is incorporated by reference herein in its entirety. The copolymers include both maleic and itaconic repeat units, and, if desired, other repeat units such as the B and C repeat units described below. All of the repeat units may be randomly distributed throughout the copolymer chains.

In detail, repeat unit B is inclusive of maleic repeat units, but is broader and is of the general formula

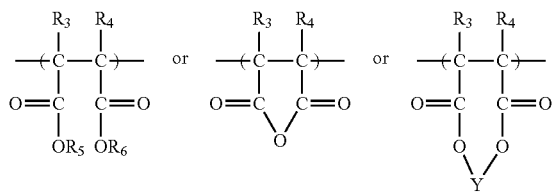

and repeat unit C is inclusive of itaconic repeat units, but is broader and is of the general formula

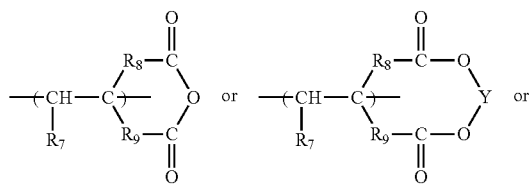

-continued

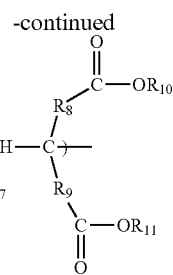

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formate ($C_0$), acetate ($C_1$), propionate ($C_2$), butyrate ($C_3$), etc. up to $C_{30}$ based ester groups, R'CO$_2$ groups, OR' groups and COOX groups, wherein R' is selected from the group consisting of $C_1$-$C_{30}$ straight, branched chain and cyclic alkyl or aryl groups and X is selected from the group consisting of H, the alkali metals, NH$_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, NH$_4$ and the $C_1$-$C_4$ alkyl ammonium groups, Y is selected from the group consisting of Fe, Mn, Mg, Zn, Cu, Ni, Co, Mo, V, W, the alkali metals, the alkaline earth metals, polyatomic cations containing any of the foregoing (e.g., VO$^{+2}$), amines, and mixtures thereof; and $R_8$ and $R_9$ are individually and respectively selected from the group consisting of nothing (i.e., the groups are non-existent), CH$_2$, C$_2$H$_4$, and C$_3$H$_6$.

As can be appreciated, the Class I copolymers typically have different types and sequences of repeat units. For example, a Class I copolymer comprising B and C repeat units may include all three forms of B repeat units and all three forms of C repeat units, so long as the copolymers contain maleic and itaconic repeat units. In the case of the Class I copolymers made up principally of B and C repeat units, $R_5$, $R_6$, $R_{10}$, and $R_{11}$ are individually and respectively selected from the group consisting of H, the alkali metals, NH$_4$, and the $C_1$-$C_4$ alkyl ammonium groups.

The Class I copolymers may have a wide range of repeat unit concentrations. For example, Class I copolymers having varying ratios of B:C (e.g., 10:90, 60:40, 50:50, 40:60, and 90:10) are contemplated and embraced by the present invention. Such copolymers would be produced by varying monomer amounts in the reaction mixture from which the final product is eventually produced and the B and C type repeat units may be arranged in the copolymer backbone in random order or in an alternating pattern. The foregoing B:C ratios also apply to the preferred Class I copolymers consisting essentially or entirely of maleic and itaconic repeat units.

The Class I copolymers may also have a wide variety of molecular weights, ranging for example from 500-5,000,000 Da, but more usually have a molecular weight of from about 2,000-15,000 Da, and more preferably from about 2,500-10,000 Da.

Preferred Class I copolymers are usually synthesized using dicarboxylic acid monomers, as well as precursors and derivatives thereof. For example, copolymers containing mono and dicarboxylic acid repeat units with vinyl ester repeat units and vinyl alcohol repeat units are contemplated; however, copolymers principally comprised of dicarboxylic acid repeat units are preferred (e.g., at least about 85%, and more preferably at least about 93%, of the repeat units are of this character).

Class I copolymers may be readily complexed with salt-forming cations using conventional methods and reactants. Usable cations can be simple cations such as sodium, but more complex cations can also be used, such as cations containing a metal atom and other atom(s) as well, e.g., vanadyl cations. Among preferred metal cations are those derived from alkali, alkaline earth, and transition metals. The cations may also be amines (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is isopropylamine. These possible secondary cations should be reacted with no more than about 10 mole percent of the repeat units of the copolymer.

Class II Copolymers Containing Sulfonate Repeat Units

The Class II polyanionic copolymers of the present invention also contain either maleic or itaconic repeat units (or both), and sulfonate repeat units, and are at least tetrapolymers, i.e., they are composed of at least four different repeat units. These copolymers thus may include, in addition to the maleic and/or itaconic repeat units and sulfonate repeat units, extra repeat units selected from the group consisting of type B', type C', and type G repeat units, and mixtures thereof. However, the Class II copolymers comprehend copolymers having more than four distinct repeat units, with the excess repeat units being selected from the group consisting of type B', type C', and type G repeat units, and mixtures thereof, as well as other monomers or repeat units not being type B', C', or G repeat units. Class II copolymers are described in WO 2015/031521, incorporated by reference herein in its entirety.

Preferred Class II copolymers contain at least one repeat unit from the B' or C' repeat units, and at least one G type repeat unit. Particularly preferred copolymers comprise a single type B' repeat unit, a single type C' repeat unit, and two different type G repeat units, or two different type B' repeat units, a single type C' repeat unit, and one or more different type G repeat units.

However constituted, preferred Class II copolymers contain at least about 90 mole percent (more preferably at least about 96 mole percent) of repeat units selected from the group consisting of type B', C', and G repeat units (i.e., the copolymers should contain no more than about 10 mole percent (preferably no more than about 4 mole percent) of repeat units not selected from types B', C', and G).

The Class II copolymers are easily converted to partial or fully saturated salts by a simple reaction with an appropriate salt-forming cation compound, and the types of usable cations are the same as those described above in connection with Class I copolymers.

1. Type B' Repeat Units

Type B' repeat units are inclusive of maleic repeat units, but more broadly are characterized as dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B' repeat units, "substituted" species refers to alkyl substituents (preferably C1-C6 straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. In preferred forms, the total amount of type B' repeat units in the Class II copolymers of the invention should range from about 1-70 mole percent, more preferably from about 20-65 mole percent, and most preferably from about 35-55 mole percent, where the total amount of all of the repeat units in the Class II copolymer is taken as 100 mole percent.

Maleic acid, methylmaleic acid, maleic anhydride, methylmaleic anhydride, and mesaconic acid (either alone or as various mixtures) are the most preferred monomers for generation of type B' repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated copolymer substantially free of ester groups.

2. Type C' Repeat Units

Type C' repeat units are inclusive of itaconic repeat units, but more broadly are characterized as derived from monomers of itaconic acid and/or anhydride, substituted itaconic acid and/or anhydride, as well as isomers, esters, acid chlorides, and partial or complete salts of any of the foregoing. The type C' repeat units are present in the preferred Class II copolymers of the invention at a level of from about 1-80 mole percent, more preferably from about 15-75 mole percent, and most preferably from about 20-55 mole percent, where the total amount of all of the repeat units in the copolymer is taken as 100 mole percent.

The itaconic acid monomer used to form type C' repeat unit has one carboxyl group, which is not directly attached to the unsaturated carbon-carbon double bond used in the polymerization of the monomer. Hence, the preferred type C' repeat unit has one carboxyl group directly bound to the copolymer backbone, and another carboxyl group spaced by a carbon atom from the copolymer backbone. The definitions and discussion relating to "substituted," "salt," and useful salt-forming cations (metals, amines, and mixtures thereof) with respect to the type C' repeat units, are the same as those set forth for the type B' repeat units.

Unsubstituted itaconic acid and itaconic anhydride, either alone or in various mixtures, are the most preferred monomers for generation of type C' repeat units. Again, if itaconic anhydride is used as a starting monomer, it is normally useful to convert the itaconic anhydride monomer to the acid form in a reaction vessel just before or even during the polymerization reaction. Any remaining ester groups in the copolymer are normally hydrolyzed, so that the final carboxylated copolymer is substantially free of ester groups.

3. Type G Repeat Units

Type G repeat units are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of C1-C8 straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the Class II copolymers of the invention should range from about 0.1-65 mole percent, more preferably from about 1-35 mole percent, and most preferably from about 1-25 mole percent, where the total amount of all of the repeat units in the Class II copolymer is taken as 100 mole percent. The definitions and discussion relating to "substituted," "salt," and useful salt-forming cations (metals, amines, and mixtures thereof) with respect to the type G repeat units, are the same as those set forth for the type B' repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during polymerization reactions yielding the novel copolymers of the invention, the presence of mixtures of alkali metal salts of these monomers with acid forms thereof does not inhibit completion of the polymerization reaction.

One preferred Class II copolymer is a partial sodium salt having a pH of about 1, with a repeat unit molar composition of maleic 45 mole percent, itaconic 50 mole percent, methallylsulfonic 4 mole percent, and allylsulfonic 1 mole percent. This specific copolymer is referred to as the "T5" copolymer.

Class IIA Copolymers

Class IIA copolymers contain both dicarboxylate and sulfonate functional groups, but are not the tetra- and higher order copolymers of Class II, but do not necessarily require either maleic-derived or itaconic-derived repeat units. However, terpolymers of maleic, itaconic, and allylsulfonic repeat units, which are per se known in the prior art, will function as the polyanionic copolymer component of the compositions of the invention. The Class IIA copolymers thus are normally copolymers and terpolymers, advantageously including repeat units individually and independently selected from the group consisting of type B, type C, and type G repeat units, without the need for any additional repeat units. Such copolymers can be synthesized in any known fashion, for instance as described in WO 2015/031521.

Class IIA copolymers preferably have at least one of maleic-derived or itaconic-derived repeat units, with the same molecular weight ranges and the other specific parameters (e.g., pH and copolymer solids loading) previously described in connection with the Class II copolymers, and may be converted to partial or complete salts using the same cations and techniques described with reference to the Class I and II Polymer 1 copolymers.

Polymer II

The Polymer II products of the invention are in the form of copolymers, preferably having substantially alternating repeat units, derived from the polymerization of maleic and olefinic repeat unit precursors. Maleic anhydride or maleic acid may be reacted with one or more olefins, as well as additional optional repeat unit precursors, to yield the Polymer II products. Thus, the olefinic repeat units are not restricted to a single type, e.g., a polymer containing substantial proportions of ethylene and propylene olefinic repeat units may be used.

These products preferably contain at least about 85% by weight of maleic and olefinic repeat units, and more preferably consist essentially of maleic and olefinic repeat units. Generally, the usable olefinic repeat units should have between about 2-8 carbon atoms, more preferably from about 2-4 carbon atoms and only 1 olefinically unsaturated carbon-carbon double bond in the repeat unit precursor. Advantageously, Polymer II products to be used as a part of liquid phosphate fertilizer additives should have either 2 or 3 carbon atom olefins (e.g., ethylene), whereas Polymer II products to be used as a part of granular phosphate fertilizer coatings should have 3 or 4 carbon atom olefins (e.g., isobutylene).

The Polymer II copolymers are usually in complete or partial salt form and should be substantially free of amide and anhydride groups (i.e., no more than about 5 mole percent of each, more preferably no more than about 1 mole percent of each). Such copolymers may be conveniently prepared by hydrolysis of available maleic anhydride-olefin copolymers (e.g., maleic anhydride-ethylene), but this is not essential. Useful salt-forming cations include the alkali and alkaline earth metals and/or amines as herein defined, especially where the ratio of carbon atoms to nitrogen atoms does not exceed about 15:1 by mole. Mixtures of such cations may also be used, if desired. Polymer II products may alternately be obtained by conventionally polymerizing selected monomers, followed by formation of partial or complete salts thereof.

The molecular weights of the Polymer II copolymers, when used for phosphate fixation inhibition, should be up to about 70,000 Da, and more preferably from about 5,000-15,000 Da. Higher molecular weight Polymer II copolymers generally do not give any additional fixation inhibition, and may be inimical to this function. However, such higher molecular weight products (having a molecular weight of at least about 200,000 Da, more preferably from about 300,000-450,000 Da) may give the overall compositions desirable rheological properties, which are helpful for dust control when the compositions are applied to solid or granular phosphate fertilizers. In such utilities, the higher molecular weight Polymer II products are used in conjunction with the lower molecular weight Polymer II products, where the weight amount of the lower molecular weight product is normally greater than that of the higher molecular weight product.

The Combined Copolymer Compositions

All of the compositions of the invention have a common feature, namely the presence of respective amounts of one or more Polymer I products, and one or more Polymer II products. However, compositions designed for use with liquid phosphate fertilizers may differ in some respects from those designed for use with solid or granular phosphate fertilizers. Moreover, and particularly with those compositions to be used with granular fertilizers, additional ingredients may be employed in order to color the compositions and/or to provide an enhanced degree of dust control.

In more detail, the compositions hereof are designed to exhibit very high levels of phosphate fixation inhibition heretofore available through use of relatively expensive polymeric mixtures, but at a significantly reduced cost. Thus, essentially complete phosphate fixation inhibition can be attained using the previously described maleic-itaconic copolymer AVAIL® products at the recommended levels of use, but the latter are relatively costly. The compositions of the invention achieve essentially equivalent fixation inhibition levels, but, owing to the increased inhibition efficiencies of the combined copolymer compositions hereof and the consequent need to use less of the compositions, the total costs to obtain the inhibition equivalence is significantly less as compared with the prior products. In short, the new compositions give all of the fixation inhibition advantages of the existing available phosphate fertilizer additives, but at a markedly decreased cost.

The weight ratio of the Polymer I:Polymer II products in the compositions of the invention should range from about 1:19 to about 19:1, more preferably from about 1:3 to about 3:1; the single most preferred compositions have about a 1:1 weight ratio.

The compositions may be in the form of aqueous dispersions or solutions having a solids content of from about 1-60% w/w, more preferably from about 10-40% w/w, and most preferably about 20% w/w, where the total weight of the compositions is taken as 100% by weight. The pH levels of the compositions are typically from 0.5-8, and more preferably from about 4-6. Both the Polymer I and Polymer II products in the compositions are usually in the form of partial or complete salts.

In the case of compositions for coating of solid or granular phosphate fertilizers, additional ingredients such as one or more dyes, dye solvent(s), and a mixture of low and high molecular weight Polymer II products may be used. These extra ingredients allow the user to clearly "mark" treated fertilizers with an appropriate color, and serve to control fines and dust sometimes encountered with solid fertilizer products. Generally, the low molecular weight Polymer II product should have a molecular weight of from about 5,000-15,000, whereas the high molecular weight Polymer II product should have a molecular weight of from about 300,000 to 400.000. The ratio of the low molecular weight to high molecular weight Polymer II products is typically in the range of from about 5:1-20:1. The dye(s) are preferably triarylmethane dyes, usually present in the compositions at a level of from about 0.2-4% by weight; Acid Violet 17 is most preferred. The dye solvent(s) preferably include polyols, especially C1-C4 dialkylene glycols, and most preferably dipropylene glycol (the commercial dipropylene glycol product is a mixture of three isomers each having different structures), and are used at levels of from about 2-20% by weight, more preferably from about 8-12% by weight, all based upon the total weight of the compositions taken as 100% by weight.

While aqueous solutions or dispersions of the combined copolymer compositions are normally prepared, this is not essential. For example, dried or powdered polymer composite solids may be added directly to liquid phosphate fertilizers, or mixed with granular phosphate fertilizers. Furthermore, it would be quite possible to individually add Polymer I and Polymer II copolymers to liquid or solid fertilizers, without ever creating a pre-combined composition.

Composites Made Up of Phosphate Fertilizers and the Combined Copolymer Compositions The compositions of the invention may be used with a variety of different phosphate fertilizers, either in solid or granular form, or as liquids. For example, the compositions may be applied to the surfaces of solid phosphates such as monoammonium phosphate (MAP), diammonium phosphate (DAP), super phosphates, triple super phosphates, and rock phosphates. The polymeric compositions may be sprayed or otherwise applied to the solid fertilizers as surface coatings, by impregnating the fertilizer solids with the compositions, or by forming mixtures of the composition solids and fertilizer solids; generally, any technique resulting in an intimate association between the copolymer compositions and solid fertilizers may be employed. Usually, the polymeric compositions are used with solid fertilizers at a level of from about 0.00001-1% by weight of copolymer solids, more preferably from about 0.001-0.1% by weight of copolymer solids, based upon the total weight of the solid fertilizer-composition composite taken as 100% by weight.

In the case of liquids such as ammonium polyphosphates (e.g., 10-34-0 or 11-37-0), the polymeric compositions are mixed with the liquid fertilizers to form uniform dispersions or solutions. The polymeric compositions may be formed using aqueous or solvent-based copolymers which may be premixed or individually added to the liquid fertilizers, or by direct mixing of copolymer solids into the liquid fertilizers. The polymeric compositions are employed at a level of from about 0.00002-2% by weight of copolymer solids, more preferably from about 0.002-0.2% by weight of copolymer solids, based upon the total weight of the liquid fertilizer-composition composite taken as 100% by weight.

The composites are used by application to soil, seeds, plants, the leaves of plants, and by any other fertilization method known in the art. The amounts of use depend upon the type of fertilization being undertaken and other well known agronomic standards.

EXAMPLES

The following Examples set forth certain preferred techniques for the preparation of compositions in accordance with the invention. It is to be understood, however, that these Examples are provided by way of illustration only, and nothing therein should be taken as a limitation upon the overall scope of the invention.

Example 1—Preparation and Use of a Combined Copolymer Composition for Treatment of Liquid Phosphate Fertilizers Approximately 400 g of deionized water at room temperature and about 50 g of sodium hydroxide solution (50% w/w, aqueous) was added to a cylindrical jacketed reactor provided with a circulator for heating and cooling of the reactor contents, a mechanical agitator system, thermometer, takeoff condenser, and systems for the introduction of liquids to the reactor. Thereupon, about 70 g of a powdered, commercially available alternating ethylene-maleic anhydride copolymer having a $M_n$ of about 27,000 and an $M_w$ of about 60,000 was added to the reactor to create a suspension. The reactor contents were then heated with vigorous stirring to about 90-98° C. over about 15 minutes, followed by continued stirring of the contents at about 95° C. for one hour, to fully dissolve the powder and give a clear liquid. The latter was cooled to about 25° C. with stirring and exhibited a pH of about 6, as a partial sodium salt of an ethylene-maleic copolymer. Then, a sufficient quantity of a 40% w/w aqueous dispersion of commercially available maleic-itaconic copolymer in partial ammonium salt form (pH about 2) was added to the reactor to achieve a weight ratio of the ethylene-maleic partial salt to maleic-itaconic partial salt of about 1.0 to 1.0, with vigorous stirring. Finally, sufficient water and anhydrous ammonia were added to the reactor to create a total dissolved solids level of about 20% w/w, and a pH of about 5.5, at 25° C.

0.5 ml of the above composition was added to 99.50 ml of a commercial liquid fertilizer mixture referred to as "10-34-0," with adequate mixing. The treated product was stable over two weeks and did not exhibit any precipitation or change in appearance upon standing, and was suitable for application to soil as a source of plant nutrition. This treated product retained its stability after one year storage in a closed container at room temperature.

Example 2—Preparation and Use of a Combined Copolymer Composition for Treatment of Liquid Phosphate Fertilizers In this Example, the Example 1 apparatus and general reaction sequence were used. Specifically, an aqueous dispersion of a commercially available ethylene-maleic anhydride copolymer having a number-averaged molecular weight of about 30,000 Da was reacted with sufficient sodium hydroxide at about 90-98° C. to provide a clear solution; this was then cooled to room temperature and gave a clear liquid with a pH of about 6, in the form of a partial sodium of an ethylene-maleic copolymer. A sufficient quantity of the commercially available maleic-itaconic copolymer of Example 1 was then added to give a 1:1 weight ratio of the two copolymer salts in dispersion. The latter was then adjusted by the addition of water, propylene glycol, and aqueous ammonia to give a total dissolved solids level of about 20% w/w, a propylene glycol content of about 5% w/w, and a pH of about 5.5 at 25° C.

0.5 ml of the above composition was added to 99.50 ml of a commercial liquid fertilizer mixture referred to as "11-37-0," with adequate mixing. The treated product was stable over two weeks and did not exhibit any precipitation or change in appearance upon standing, and was suitable for application to soil as a source of plant nutrition. This treated product retained its stability after one year storage in a closed container at room temperature.

Example 3—Preparation and Use of a Combined Copolymer Composition for Treatment of Granular Phosphate Fertilizers The same apparatus and general reaction sequence of Example 1 was followed. Specifically, an aqueous dispersion of an isobutylene-maleic anhydride copolymer having a molecular weight of about 6,000 Da (about 20% w/w solids) was created, followed by reaction with sufficient sodium hydroxide solution at about 95-98° C., providing a clear solution; this was then cooled to room temperature to give a clear liquid with a pH of about 7.5, as a partial sodium salt of an isobutylene-maleic copolymer. A sufficient quantity of a commercially available maleic-itaconic copolymer in partial sodium salt form was then added to give a 1:1 weight ratio of the two copolymer salts in dispersion. The latter was then adjusted by the addition of water and sodium hydroxide to give a total dissolved solids level of about 20% w/w, and a pH of about 7.5 at 25° C.

2.10 ml of the above composition was added to 1,000 g of a commercial grade granular monoammonium phosphate fertilizer referred to as "MAP," with adequate mixing of the granules, and allowing the coating to dry thereon. The treated product was stable over two weeks and did not exhibit any change in appearance upon standing, and was suitable for application to soil as a source of plant nutrition.

Example 4—Preparation and Use of a Combined Copolymer Composition for Treatment of Granular Phosphate Fertilizers The procedure described in Example 3 was followed except that in the last step the dual copolymer dispersion was adjusted by the addition of water, sodium hydroxide, and dipropylene glycol to give a total dissolved solids level of about 20% w/w, a dipropylene glycol content of about 10% w/w, and a pH of about 7.5 at 25° C.

2.10 ml of the above composition was added to 1,000 g of a commercial grade granular diammonium phosphate fertilizer referred to as "DAP," with adequate mixing of the granules, and allowing the coating to dry thereon. The treated product was stable over two weeks and did not exhibit any change in appearance upon standing, and was suitable for application to soil as a source of plant nutrition.

Example 5—Preparation of a Combined Copolymer Composition for Treatment of Granular Phosphate Fertilizers, with Dye Addition The product of Example 4 was further treated by the addition of powdered Acid Violet 17 dye, which was allowed to fully dissolve and provided a 0.25% w/w concentration of dye in the product. This treated product retained its stability after one year storage in a closed container at room temperature.

Example 6—Preparation of a Combined Copolymer Composition for Treatment of Granular Phosphate Fertilizers, with Dye Addition and Dust Control The same apparatus and general reaction sequence of Example 1 was followed to create a high molecular weight (HMW) isobutylene-maleic copolymer partial sodium salt having a molecular weight of about 350,000 Da and a solids concentration of about 3%. This product was a clear viscous liquid with a pH of about 7.5.

The HMW product was then combined with respective amounts of the isobutylene-maleic copolymer partial sodium salt and the maleic-itaconic copolymer partial sodium salt of Example 3, and the other ingredients set forth below to yield a final product. The ingredients and amounts used in this product were, all as % w/w where the total mixture was taken as 100%:

maleic-itaconic copolymer, partial sodium salt, 10%
isobutylene-maleic copolymer partial sodium salt, molecular weight about 6,000 Da, 10% dipropylene glycol, 10%
HMW isobutylene-maleic copolymer partial sodium salt, 1%
Acid Violet 17, 2.5%
balance, water This product is designed for coating of solid granular phosphate fertilizers, and exhibits the preferred phosphate fixation inhibition synergistic effects of the invention. Moreover, the violet color of the product is stable over many months storage and, when applied to granular fertilizers, gives the coated products an easily observable color, which is maintained until the dye comes into contact with sufficient water. Additionally, the product gives excellent control of dust in the coated fertilizers. This treated product retained its stability after one year storage in a closed container at room temperature.

In another variant, fines or dust-control polymeric compositions for use with solid phosphate fertilizers can be provided, which include a first high molecular weight copolymer having maleic and olefinic repeat units, and a second low molecular weight copolymer likewise having maleic and olefinic repeat units. Advantageously, the first high molecular weight copolymer has a molecular weight of from about 300,000-400,000, and the second low molecular weight copolymer has a molecular weight of from about 5,000-15,000. The weight ratio of the second low molecular weight copolymer to the first high molecular weight copolymer should range from about 5:1-20:1. One or more colorant dyes (preferably triarylmethane dyes) may be incorporated into these dust-control polymeric compositions at a level of from about 0.2-4% by weight, based on the total weight of the composite taken as 100% by weight. The dyes may further be dispersed in one or more polyols, e.g., dipropylene glycol. The dust-control polymeric compositions, with or without colorant dye, are preferably incorporated into a solid phosphate fertilizer at a level of from about 0.00001-1% by weight, based upon the total weight of the solid fertilizer-polymeric composition composite taken as 100% by weight.

Example 7—Inhibition of Phosphate Fixation Using the Combined Copolymer Compositions of the Invention In this Example, various combinations of partial salts of maleic-itaconic copolymer and ethylene-maleic copolymer were tested at least in duplicate to determine the inhibitory effects thereof against calcium-induced phosphate fixation. In particular, Polymer I was the partial ammonium salt maleic-itaconic copolymer described in Example 1, and Polymer II was the maleic-ethylene partial sodium salt copolymer of Example 1. Polymers I and II were used to create combined copolymer compositions having incremental additions of Polymer II to Polymer I, beginning with 100% Polymer I/0% Polymer II and ending with 0% Polymer I/100% Polymer II. In each case, the single and combined copolymer compositions contained a total of 125 ppm of copolymer.

These compositions were then screened by an identical technique to measure the phosphate fixation inhibition properties of each composition. The following data points were determined:

| POLYMER I SOLIDS | POLYMER II SOLIDS | % INHIBITION |
| --- | --- | --- |
| 100% | 0% | 21.6 |
| 90% | 10% | 47.8 |
| 75% | 25% | 60.0 |
| 50% | 50% | 62.8 |
| 25% | 75% | 50.2 |
| 10% | 90% | 39.2 |
| 0% | 100% | 25.1 |

A number of different methods may be used to determine phosphate fixation properties, including that discussed in Amjad, Z. and, Zuhl, R. W., 2002, *The Influence of Polymer Architecture on Inhibition of Amorphous Calcium Phosphate Precipitation*, The Phosphorus Res. Bull. (12):51-57, which test method is incorporated by reference herein. The only changes required from the reference method are: replace potassium dihydrogen phosphate with diammonium phosphate; calcium chloride and phosphate added directly to the glass cells with distilled water; and omission of the addition of 0.1 M NaOH solution.

The FIGURE sets forth results of this study. As illustrated, the 100% Polymer I and Polymer II compositions each exhibited an inhibition performance of about 20-26% each, whereas the mixtures all had improved performances, more particularly those having from about 10-80% Polymer II therein. The best results were obtained with compositions having from about 25-75% Polymer II.

This test demonstrates the synergistic effects of combined Polymer I-Polymer II compositions, and confirms that the combined copolymer compositions have much better inhibition performances, as compared with the Polymer I and Polymer II products alone.

We claim:

1. A polymeric composition comprising a first copolymer having at least two repeat units selected from the group consisting of maleic, itaconic, and sulfonate repeat units, and a second copolymer having maleic and olefinic repeat units.

2. The composition of claim 1, said first copolymer having at least about 85% by weight maleic and itaconic repeat units therein.

3. The composition of claim 2, said first copolymer consisting essentially of maleic and itaconic repeat units.

4. The composition of claim 1, said first copolymer comprising sulfonate repeat units as one of said at least two repeat units.

5. The composition of claim 4, said second copolymer having one or more olefinic repeat units, wherein the olefinic repeat units are selected from the group consisting of ethylene and isobutylene repeat units, and mixtures thereof.

6. The composition of claim 1, said polymeric composition being in aqueous dispersion or solution.

7. The composition of claim 6, said polymeric composition being present at a level to provide a copolymer solids content of from about 1-60% by weight, based upon the total weight of the aqueous dispersion or solution taken as 100% by weight.

8. The composition of claim 6, said composition having a pH of from about 0.5-8.

9. The composition of claim 1, said first copolymer having a molecular weight of from about 2,000-15,000 Da, said second copolymer having a molecular weight of up to about 70,000 Da.

10. The composition of claim 1, the weight ratio of said first copolymer to said second copolymer ranging from about 1:19 to about 19:1.

11. The composition of claim 1, including a dye and one or more dye solvents.

12. The composition of claim 11, said dye comprising Acid Violet 17 and said dye solvent comprising dipropylene glycol.

13. The composition of claim 1, including individual amounts of two different second copolymers, one of said second copolymers having a molecular weight of up to about 70,000 Da, and the other of said second copolymers having a molecular weight of at least about 200,000 Da.

14. The composition of claim 1, said composition including the first and second copolymers as dried copolymer solids.

15. A composite comprising a phosphate fertilizer with the polymeric composition of claim 1.

16. The composite of claim 15, said fertilizer being a solid fertilizer, the copolymer solids content of said composition being from about 0.00001-1% by weight, based upon the total weight of the solid fertilizer-composition composite taken as 100% by weight.

17. A method of fertilizing soil comprising the step of applying to the soil the composite of claim 15.

18. A method of preparing a fertilizer composite comprising the step of incorporating the polymeric composition of claim 1 into a phosphate fertilizer.

19. The method of claim 18, said phosphate fertilizer being a solid fertilizer, said polymeric composition in intimate contact with said solid fertilizer.

20. The method of claim 19, the copolymer solids content of said composition being from about 0.00001-1% by weight, based upon the total weight of the solid fertilizer-composition composite taken as 100% by weight.

21. A method of reducing the incidence of fines or dust from solid or granular phosphate fertilizer, comprising the step of contacting the phosphate fertilizer with a polymeric composition comprising a first high molecular weight copolymer having maleic and olefinic repeat units, and a second low molecular weight copolymer having maleic and olefinic repeat units.

22. The method of claim 21, said first high molecular weight copolymer having a molecular weight of from about 300,000-400,000, said second low molecular weight copolymer having a molecular weight of from about 5,000-15,000.

23. The method of claim 21, the weight ratio of the second low molecular weight copolymer to the first high molecular weight copolymer ranging from about 5:1-20:1.

* * * * *